United States Patent [19] [11] 4,403,749
Nakagawa [45] Sep. 13, 1983

[54] TAPE REEL
[75] Inventor: Akira Nakagawa, Tokyo, Japan
[73] Assignee: Nifco, Inc., Yokohama, Japan
[21] Appl. No.: 241,240
[22] Filed: Mar. 6, 1981
[30] Foreign Application Priority Data
  Mar. 7, 1980 [JP] Japan .............................. 55-28807[U]
  Mar. 7, 1980 [JP] Japan .............................. 55-28808[U]
[51] Int. Cl.³ ...................... B65H 75/18; B65H 75/20
[52] U.S. Cl. ................................ 242/71.8; 242/118.61
[58] Field of Search .................... 242/71.8, 71.9, 115,
     242/116, 118, 118.6, 118.61, 118.5, 118.8,
                                         118.62, 68.5, 68.6
[56] References Cited
        U.S. PATENT DOCUMENTS
  4,176,804 12/1979 Nemoto .............................. 242/71.8
  4,203,564  5/1980 Nemato .............................. 242/71.8
  4,226,381 10/1980 Katata .............................. 242/71.8
  4,289,282  9/1981 Kohno .............................. 242/71.8

Primary Examiner—Stuart S. Levy
Assistant Examiner—Thomas R. Hannon
Attorney, Agent, or Firm—Schwartz & Weinrieb

[57] ABSTRACT

A tape reel, comprising a hub and a pair of flanges attached one each to the opposite ends of the hub and obtainable by integrally molding one of the pair of flanges at the end of the hub and separately molding the other flange and subsequently fastening the separately molded flange by ultrasonic welding to the free end of the hub, is provided either on the hub or on the separately molded flange with means for absorbing impacts of the ultrasonic vibrations and, thereby, is prevented from sustaining fractures and distortions during the work of ultrasonic welding.

26 Claims, 5 Drawing Figures

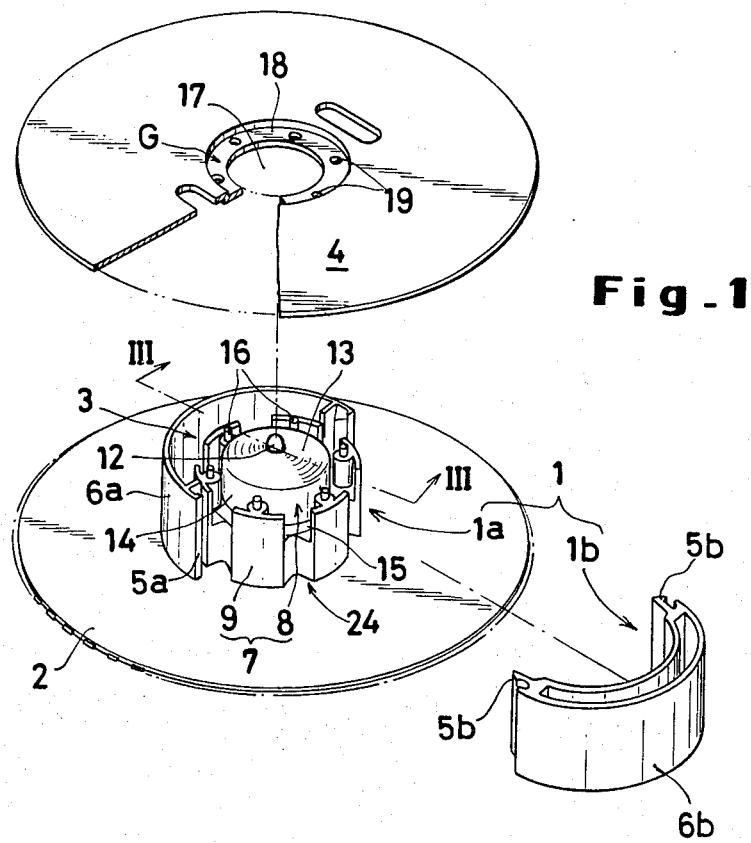
Fig_1
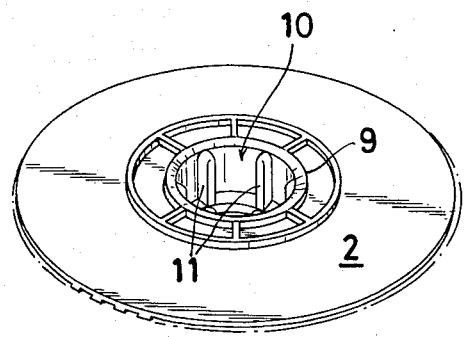
Fig_2

Fig_3
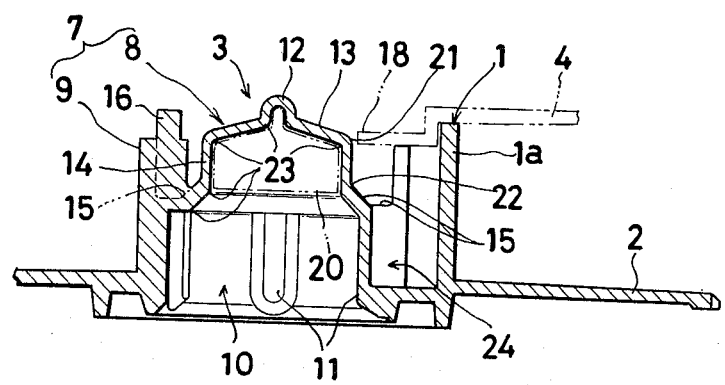
Fig_4
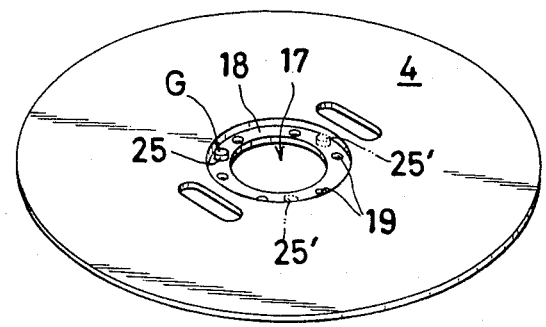
Fig_5
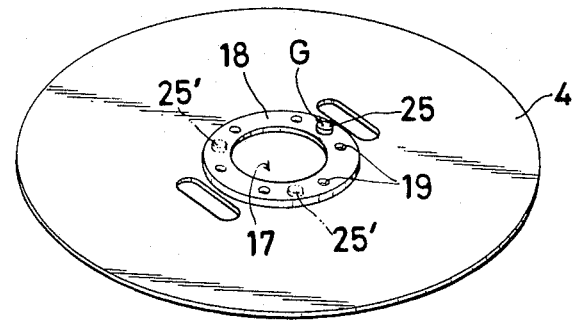

TAPE REEL

FIELD OF THE INVENTION

This invention relates to improvements in and relating to plastic tape reels for use with video cassette tapes.

BACKGROUND OF THE INVENTION

Generally, the tape reel for the video cassette tape comprises a hub for winding a magnetic tape into a roll thereon and two flanges attached one each to the opposite axial ends of the hub, and it is made of a plastic material. The hub possesses a blind engaging hole bored inwardly from one axial end thereof, provided on the inner wall surface thereof with a plurality of ribs and adapted for engagement with the reel engaging shaft on the cassette recording/playback machine. The hub is further provided at the center on the other axial end thereof with a small protuberance adapted for contact with the resilient retainer piece on the cassette case side.

In the tape reel of the construction described above, one of the flanges is integrally molded at one axial end of the hub, while the other flange is independently molded and subsequently joined to the remaining free axial end of the hub by means of ultrasonic welding. Otherwise, the joining is accomplished by separately forming the aforementioned small protuberance with a different material and providing the carrier member of the small protuberance with engaging means.

While the independently molded flange is being joined by ultrasonic welding to the aforementioned free axial end of the hub, either one or both of these components tend to sustain cracks and fractures. Even after the flange has been joined to the hub, either component may sustain distortion. Occurrence of such faults has been frequently experienced by the conventional tape reel. The inventor's study in search of causes for such phenomena has revealed that the ultrasonic waves used during the work of fastening the independently molded flange to the hub produce more vibratory force than would be reasonably expected and, because of the resultant resonance, inflict cracks and fractures upon the hub and/or the flange and even cause the flange to be fastened to the hub in a distorted state.

OBJECTS OF THE INVENTION

An object of this invention is to provide a tape reel which avoids sustaining fractures and distortions at the time that the independently molded flange is fastened by ultrasonic welding to the free axial end of the hub.

SUMMARY OF THE INVENTION

To accomplish the object described above according to the present invention, there is provided a tape reel which incorporates means capable of absorbing the impact of ultrasonic vibrations in either the hub or the independently molded flange destined for attachment to the free axial end of the hub or in both. One typical embodiment of this impact absorption means resides in joining the aforementioned free axial end of the hub and the vertical cylindrical wall of the hub with a rounded corner instead of an abrupt rectangular corner.

Owing to the provision of such impact absorption means as described above, the strong vibratory force generated by the ultrasonic waves during the fastening of the independently molded flange to the free axial end of the hub is borne by the entire hub with such thoroughness that otherwise possible infliction of cracks, fractures and distortions is avoided. The tape reel thus produced, therefore, enjoys high dimensional accuracy.

The other objects and characteristics of this invention will become apparent from the further disclosure of the invention to be made hereinbelow with reference to the accompanying drawings.

BRIEF DESCRIPTION OF THE DRAWING

FIG. 1 is an exploded perspective view of one embodiment of the tape reel according to the present invention.

FIG. 2 is a perspective rear view of the flange molded integrally with the hub in the tape reel of FIG. 1.

FIG. 3 is a sectional view taken along the line III—III of FIG. 1.

FIG. 4 is a perspective view of one embodiment of the flange in the tape reel of the present invention.

FIG. 5 is a perspective view of another embodiment of the flange in the tape reel of the present invention.

DESCRIPTION OF THE PREFERRED EMBODIMENTS

The first embodiment of the tape reel provided by the present invention is illustrated in FIGS. 1-3. As an aid to the comprehension of the construction of this tape reel in terms of structural strength, the portion of the construction which belongs to the public domain will be described.

The illustrated tape reel represents a construction wherein the outer circumferential part of the hub 1 is divided into two halved portions 1a, 1b. These two halved portions are generally joined into one complete hub by snap engaging means 5a, 5b adapted to snap into fast engagement with each other. When the two halved portions are thus joined, their outer surfaces jointly form the outer circumferential surface of the hub on which a tape is wound into a roll. Generally in this construction, the tape end is pinched fast between the two halved portions 1a, 1b when they are joined to each other. In the tape reel of a different construction, the one halved portion 1a is formed in the shape of a nearly complete cylinder containing a small gap in the circumferential wall thereof. A depressed space formed inwardly from this gap serves as a tape end retainer hole.

The hub also has an inner cylindrical portion 7 opposed to the outer circumferential portions 1a, 1b. In the illustrated tape reel, this inner cylindrical portion 7 consists of two concentric members, the central cylindrical portion 8 and the cylindrical wall portion 9 disposed outside the central cylindrical portion relative to the radial direction. The interior of the inner cylindrical portion 7 which consists of these two portions 8, 9 has a construction as illustrated in FIG. 3.

A socket 10 for receiving and retaining in position the well-known reel engaging shaft (not shown) on the tape transport side of the deck opens into the free end of the hub and extends upwardly in the axial direction to a level approximately the entire height of the hub. This socket 10 is provided with a plurality of ribs 11 spaced at fixed angular intervals and raised inwardly and radially from the inner wall surface of the hub (providing that the total number and size of these ribs and the size of the angular intervals separating the ribs are matters to be determined by the particular type of the video cassette). These ribs are adapted for intimate engagement with the corresponding ribs formed on the reel engaging shaft. The socket 10 for receiving the reel shaft and the ribs 11 contained therein are clearly shown in FIG. 2 which represents the rear perspective view of the tape reel.

The central cylindrical portion 8 is disposed on the front side and is provided at the central pointed end thereof with a small protuberance 12 of the shape of a nipple. As is well known, this protuberance is intended to come into contact with the resilient retainer piece (not shown) on the cassette housing side and smoothe the rotation of the reel. This small protuberance continues downwardly through the slightly downwardly sloped upper surface portion 13 into the axially upright wall portion 14, then diverges downwardly in the radial outward direction approximately halfway in the entire length and terminates into the annular joint portion 15, which continues into the cylindrical wall portion 9.

On the inner boundary of the cylindrical wall portion 9, a plurality of bosses 16 spaced at suitable angular intervals in the circumferential direction (six bosses spaced at intervals of 60° in the illustrated embodiment) protrude upwardly in the axial direction.

The separately molded flange 4 is provided at the center thereof with a central opening 17 to be passed through by the small protuberance 12 and the upper surface portion 13 supporting the protuberance. The circular edge portion 18 defining this central opening is stepped down from the flange. As indicated by the imaginary line in the righthand part of FIG. 3, the central opening 17 and the circular edge portion 18 fit to the outer circumferential portions 1a, 1b and the depression of the upper surface of the cylindrical wall portion 9 at the free end of the hub 3. In this circular edge portion 18, holes 19 for passing the bosses 16 on the hub side are formed at the corresponding positions.

The fastening of the flange to the hub, therefore, is accomplished by a procedure involving the steps of fitting the circular edge portion 18 of the flange 4 into the depression on the free end of the hub, allowing the bosses 16 to pass through and emerge from the holes 19, applying a jig to the protruding tips of the bosses and imparting ultrasonic vibrations to the tips to crush the tips thereby setting the flange fast in position between the crushed tips of the bosses and the free end of the hub.

In the conventional tape reel, the fabrication involving application of vibrations has frequently caused troubles such as infliction of cracks upon the central cylindrical portion 8 and has also tended to impair the dimensional accuracy such as true circularity.

Analysis of the phenomena has unveiled the fact that lack of uniformity of the distribution of strength in the free end of the hub or large variation in the wall thickness of the free end constitutes one cause.

First of all in the conventional tape reel, the part of the central cylindrical portion 8 from the socket 10 for the upwardly extending reel engaging shaft, namely the part enclosed by the imaginary line 20 in the sectioned view of FIG. 3, has been a solid structure. Consequently, this part has had a wall thickness extremely large as compared with the other parts.

In the second place, the circumferential corner 21 where the upper surface portion 13 which starts from the base of the small protuberance 12 and the axial wall portion 14 meet each other and the circumferential corner 22 where the axial wall portion 14 and the annular joint portion 15 meet each other are both abruptly rectangular in cross section.

As a result, the stress generated during the application of vibrations is concentrated at these abrupt rectangular corners and, to make the matter worse, these corners have a greater interior mass than the other parts. There consequently occurs an equivalent vibratory system, which tends to resonate with a specific frequency of the ultrasonic waves in use owing to the junctional compliance. Thus, regions of concentrated stress have occurred at the corners 21, 22 and they have sustained distortions and cracks.

As the primary element for its construction, therefore, this invention forms the upper interior 20 of the reel shaft socket 10 in the shape of a hollow blind hole and gives to the small protuberance 12, the upper surface portion 13 and the axial wall portion 14 a wall thickness not appreciably different from the wall thickness of the other portions.

As an additional element, the present invention smoothly curves the regions such as the corners 21, 22 where the various surfaces of the inner cylindrical portion 7 meet each other so as to preclude occurrence of abrupt rectangular corners. Furthermore, it smoothly curves the interior corner portions 23 where the inner wall surfaces formed within the interior excavation 20 meet each other to avoid occurrence of sharp rectangular corners.

In the formation of the hub, all the component portions of the hub are given wall thicknesses not conspicuously different from one another and the corner connecting the upper surface portion and the axial wall portion of the hub and the corner connecting the axial wall portion and the annular joint portion are given a rounded surface smoothly curved in cross section as described above. Owing to the special construction, the strong vibrations generated during the fastening of the independently molded flange to the free axial end of the hub by the ultrasonic welding do not cause cracks or distortions in the hub. Further during the molding of the tape reel, this special construction facilitates the flow of the molten resin within the molding die. The produced tape reel, therefore, enjoys high dimensional accuracy.

Enhancement of the circularity of the flange which is integrally molded with the hub is obtained by inserting depressions one each in the rear sides of the ribs 11 for shaft engagement. These depressions are denoted by 24 in FIG. 1. By the insertion of these depressions, all the component parts of the inner cylindrical portion 8 acquire a substantially uniform wall thickness. During the molding of the hub and the flange, therefore, the molten resin is allowed to flow smoothly to all the corners of the molding die. The produced flange, therefore, excels in circularity and flatness.

Now, an embodiment wherein the flange molded separately of the hub is provided with means for absorbing the impact of the ultrasonic waves will be described with reference to FIGS. 4–5. This flange is relatively thin and is subjected to external forces at the time it is fastened to the free end of the hub. If the injection molding of a plastic material fails to produce this flange with sufficient homogeneity of constitution, the produced flange tends to sustain distortions and cracks when it is fastened to the hub by ultrasonic welding. Such flaws are particularly liable to occur in the regions corresponding to the site of the gate for the molten resin in the molding die used in the injection molding. When the injection gate is locked directly on the surface of the molded article as indicated by the point G in FIG. 1, the flange which is inherently thin by any standard tends to acquire inferior strength in the portion adjacent to the point G. Thus, this particular portion offers necessary resistance to the external impacts during the ultrasonic welding and, consequently, sustains distortions and cracks.

To overcome this difficulty, at least one thick projection 25 greater than the area of the opening of the injection gate is provided at one position on the surface of the flange 4 as illustrated in FIG. 4. During the injection molding of the plastic material, the upper surface of this projection is utilized as the gate G. The projection 25 intended for the injection gate is desired to be located as near to the center of the flange 4 as possible. This is because the paths for the molten resin from this gate to the various points along the outermost edge of the flange can be equalized and the possibility of uneven molding can be diminished proportionally.

Where provision of a plurality of gates proves desirable from the standpoint of molding, the number of corresponding projections may be increased as indicated by the imaginary line in the drawing. During the injection molding of the plastic material, injection orifices or gates for the molten resin may be located on the upper surfaces of these projections.

Where these projections are not desired to protrude excessively in the axial direction, they may be disposed on the recessed inner circular edge 18 stepped down from the flange and raised to a height flush with the surface of the flange. Otherwise, after the injection molding is completed, these projections may be suitably cut off substantially completely because they have already fulfilled their part.

Alternatively, projections 25, 25' may be formed on the rear surface side of the flange 4 as illustrated in FIG. 5. In this case, since these projections are formed in the positions destined to fit into circumferential spaces formed between the bosses 16 on the free end 3 of the hub illustrated in FIG. 1, they do not interfere with the work of fastening the flange to the hub. Once the flange is fastened to the hub, these projections are concealed and do not impair the appearance of the completed tape reel. Thus, they prove convenient because they need not be cut off after the completion of the work of fastening of the flange.

Where the upper ends of these projections are utilized as the injection gates for the molten resin as described above, even if the gate marks remain after the molding work and decrease the wall thickness in the corresponding positions, they will not bring about any loss of strength because the projections, by nature, have a sufficiently large thickness from the beginning. Further, during the injection molding of the plastic material, these projections function as reservoirs of some sort for the molten resin and discharge the resin through their outlets (lower ends thereof) and distribute it evenly in all the directions. In contrast, where the injection gates for the molten resin are directly opened into the molding chamber, directionality occurs to govern the flow of the molten resin, spoil the uniformity of the molding of the tape reel (particularly the flange) and impair the dimensional accuracy, for example, the circularity and thickness. In this respect, the present embodiment has an advantage that the design of the injection gates is notably facilitated.

As is clear from the description given above, the tape reel of this invention is provided on either the hub or the independently molded flange or on both with means for absorbing impacts of the vibrations from the ultrasonic welding. Consequently, the hub and the flange are prevented from sustaining fractures and distortions during their union by the ultrasonic welding. This invention, accordingly, permits tape reels of high quality to be produced in high yields.

Obviously, many modifications and variations of the present invention are possible in light of the above teachings. It is therefore to be understood that within the scope of the appended claims, the present invention may be practiced otherwise than as specifically described herein.

What is claimed is:

1. An improved tape reel comprising a hub for winding a tape on the periphery thereof, a pair of flanges attached one each to the opposite end surfaces of said hub, the first of the pair of flanges being molded integrally with said hub and the second flange being molded separately of the hub, said hub containing a socket opening into the free end of the hub and adapted to receive a reel rotating shaft in a recording/playback machine in the axial direction, the free end of said hub having a plurality of bosses raised from the free end surface, said second flange being provided with holes at the positions corresponding to those of said bosses, whereby the union of said hub and said second flange for the completion of the tape reel is accomplished by inserting the bosses on the hub into the corresponding holes in the second flange and crushing the protruding tips of the bosses against the second flange by means of ultrasonic vibrations, the improvement comprising:
   providing the hub with means for virtually uniformly absorbing the impacts of said ultrasonic vibrations throughout the free axial end of said hub.

2. The tape reel as set forth in claim 1, wherein said means for virtually uniformly absorbing the impacts of said ultrasonic vibrations comprises:
   the wall portions of said free axial end of said hub having substantially the same thickness dimensions.

3. The tape reel as set forth in claim 1, wherein:
   said socket has an upper portion disposed above a lower portion for engaging said recording/playback machine rotating shaft; and
   said upper portion of said socket defines a hollow blind cavity.

4. The tape reel as set forth in claim 3, wherein said impact absorbing means comprises:
   the wall portions of said hollow blind cavity of said upper socket portion are of substantially the same thickness dimensions relative to each other.

5. The tape reel as set forth in claim 3, wherein said impact absorbing means comprises:
   the wall portions of said hollow blind cavity of said upper socket portion are of substantially the same thickness dimensions as that of said lower socket portion.

6. An improved tape reel comprising a hub for winding a tape on the periphery thereof, a pair of flanges attached one each to the opposite end surfaces of said hub, the first of the pair of flanges being molded integrally with said hub and the second flange being molded separately of the hub, said hub containing a socket opening into the free end of the hub and adapted to receive a reel rotating shaft in a recording/playback machine in the axial direction, the free end of said hub having a plurality of bosses raised from the free end surface, said second flange being provided with holes at the positions corresponding to those of said bosses, whereby the union of said hub and said second flange for the completion of the tape reel is accomplished by inserting the bosses on the hub into the corresponding holes in the second flange and crushing the protruding tips of the bosses against the second flange by means of ultrasonic vibrations, the improvement comprising:

providing the hub with means for absorbing the impacts of said ultrasonic vibrations, and the stresses generated thereby, in a deconcentrated manner virtually throughout the free axial end of said hub.

7. The tape reel as set forth in claim 6, wherein said means for absorbing said impacts of said ultrasonic vibrations, and said stresses generated thereby, in a deconcentrated manner, comprises:

forming said free axial end of said hub from a plurality of axially and radially extending wall portions; and interconnecting said wall portions by means of rounded corner structures.

8. The tape reel according to claim 6, wherein said impact absorbing means is a curved surface formed in the corner connecting the wall surface and the free end surface of the hub.

9. The tape reel according to claim 8, wherein the hub is provided on the free end surface thereof with a small hollow protuberance adapted for pressed contact with a resilient retainer piece of a cassette housing.

10. The tape reel according to claim 9, wherein the free end surface of the hub on which said small protuberance is formed gradually declines downwardly toward the axially upright wall surface of the hub and the rising portion of the small protuberance and the adjoining portion form an obtuse angle of not less than 90 degrees.

11. The tape reel as set forth in claim 6, wherein said free end of said hub comprises:

a protuberance;

an upper surface portion extending downwardly and radially outwardly from said protuberance;

an axially extending cylindrical wall portion extending downwardly from said radially outer periphery of said upper surface; and an annular joint portion connected to the lower end of said axial cylindrical wall portion.

12. The tape reel as set forth in claim 11, wherein: the exterior annular edge or corner connecting said upper surface portion and said axial cylindrical portion is smoothly rounded.

13. The tape reel as set forth in claim 11, wherein: the exterior annular edge or corner connecting said axial cylindrical portion and said annular joint portion is smoothly rounded.

14. The tape reel as set forth in claim 11, wherein: the interior annular edge or corner connecting said upper surface portion and said axial cylindrical portion is smoothly rounded.

15. The tape reel as set forth in claim 11, wherein: the interior annular edge or corner connecting said protuberance and said upper surface portion is smoothly rounded.

16. The tape reel as set forth in claim 11, wherein: the interior annular edge or corner connecting said axial cylindrical portion and said annular joint portion is smoothly rounded.

17. An improved tape reel comprising a hub for winding a tape on the periphery thereof, a pair of flanges attached one each to the opposite end surfaces of said hub, the first of the pair of flanges being molded integrally with said hub and the second flange being molded separately of the hub, said hub containing a socket opening into the free end of the hub and adapted to receive a reel rotating shaft in a recording/playback machine in the axial direction, the free end of said hub having a plurality of bosses raised from the free end surface, said second flange being provided with holes at the positions corresponding to those of said bosses, whereby the union of said hub and said second flange for the completion of the tape reel is accomplished by inserting the bosses of the hub into the corresponding holes in the second flange and crushing the protruding tips of the bosses against the second flange by means of ultrasonic vibrations, the improvement comprising:

providing the second flange with a thickened portion having an increased wall thickness relative to the remainder of said second flange for absorbing the impacts of said ultrasonic vibrations.

18. The tape reel according to claim 17, wherein said impact absorbing increased wall thickness is adapted for connection to an injection gate for molten resin.

19. The tape reel according to claim 17, wherein the portion of increased wall thickness formed on the second flange is in the shape of a projection.

20. The tape reel as set forth in claim 17, wherein: said increased wall thickness is formed upon the upper surface of said second flange.

21. The tape reel as set forth in claim 17, wherein: said increased wall thickness is formed upon the rear or undersurface of said second flange.

22. The tape reel according to claim 17, wherein the second flange has a depressed portion for intimate contact with the free end surface of the hub and said impact absorbing means is a portion of increased wall thickness formed on the depressed portion.

23. The tape reel as set forth in claim 22, wherein: said increased wall thickness is formed upon the upper surface of said depressed portion of said second flange.

24. The tape reel as set forth in claim 22, wherein: said increased wall thickness is formed upon the rear or undersurface of said depressed portion of said second flange.

25. The tape reel as set forth in claim 22, wherein: said depressed portion is an annular, central portion of said second flange extending axially downwardly.

26. The tape reel as set forth in claim 23 or 24, wherein:

said depressed portion is an annular, central portion of said second flange extending axially downwardly.

* * * * *